(12) United States Patent  
Sueda

(10) Patent No.: US 7,131,649 B2  
(45) Date of Patent: Nov. 7, 2006

(54) METAL GASKET

(75) Inventor: Masakazu Sueda, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/365,592

(22) Filed: Mar. 2, 2006

(65) Prior Publication Data

US 2006/0145427 A1    Jul. 6, 2006

Related U.S. Application Data

(63) Continuation of application No. 10/804,070, filed on Mar. 19, 2004.

(30) Foreign Application Priority Data

Mar. 26, 2003   (JP)   ............................. 2003-084113

(51) Int. Cl.
 *F02F 11/00*   (2006.01)
(52) U.S. Cl. ...................................... 277/594; 277/598
(58) Field of Classification Search ........ 277/591–596, 277/598
See application file for complete search history.

(56) References Cited

U.S. PATENT DOCUMENTS 4,387,904 A * 6/1983 Nicholson .................. 277/595
4,759,585 A * 7/1988 Udagawa .................... 277/595
4,948,153 A * 8/1990 Takahashi et al. .......... 277/605
5,199,723 A * 4/1993 Udagawa .................... 277/595
5,232,229 A * 8/1993 Udagawa .................... 277/595

FOREIGN PATENT DOCUMENTS

JP          01285645 A  * 11/1989
JP          04095669 A  *  3/1992
JP          09229198 A  *  9/1997

* cited by examiner

*Primary Examiner*—Vishal Patel
(74) *Attorney, Agent, or Firm*—Manabu Kanesaka

(57) ABSTRACT

A metal gasket is formed by first and second metal base plates. The first metal base plate has a first main bead, and first outer and inner sub-bead sections formed outside and inside the first main bead and projecting outwardly in a direction opposite to the first main bead. The second metal base plate has a second main bead, and second outer and inner sub-bead sections formed outside and inside the second main bead and projecting outwardly in a direction opposite to the second main bead. A distance between the second outer and inner sub-bead sections is greater than that between the first outer and inner sub-bead sections. When the first and second metal base plates are assembled, the second outer and inner sub-bead sections entirely sandwich the first outer and inner sub-bead sections therebetween to substantially abut against each other at side peripheries thereof.

6 Claims, 5 Drawing Sheets

# METAL GASKET

CROSS-REFERENCE TO RELATED APPLICATION

This is a continuation application of Ser. No. 10/804,070 filed on Mar. 19, 2004.

BACKGROUND OF THE INVENTION AND RELATED ART STATEMENT

The invention relates to a metal gasket, such as a cylinder head gasket, to be sandwiched between two members, for example a cylinder head and a cylinder block, of an internal combustion engine to seal therearound.

In case joint surfaces of a cylinder head and a cylinder block (cylinder body) of a vehicle are sealed, combustion gas, cooling water, lubricating oil and the like are sealed by sandwiching a cylinder head gasket therebetween.

To meet demands of reducing weight of an engine and a production cost, a cylinder head gasket has been changed to a simple structural cylinder head gasket formed of one or two metal base plates from a metal laminate type gasket including a plurality of metal base plates. Therefore, the constituent plates become one or two, usable materials are limited from the aspect of making an engine light, and the kind and number of sealing devices are also limited, which forces to use relatively simplified sealing devices.

Therefore, mainly for a cylinder head gasket, for example as shown in FIG. 13, there has been proposed a gasket 2, wherein a main bead 6A and sub-beads 6B linearly connected to the hem portions of the main bead 6A are provided to a metal plate 2 so that surface pressures are generated concentrically at top portions of the main bead 6A and the sub-beads 6B to positively seal with large surface pressures (For example, Japanese Patent Publication (KOKAI) No. 11-230355, refer to page 2, FIG. 2).

Also, as a gasket formed of two plates, as shown in FIG. 14, there has been proposed a metal laminate gasket for sealing a port of an intake-exhaust system of an engine, wherein a sectional shape of a circular bead 4 surrounding the port 2 is formed in a wave shape having two continuous mountain-shape portions 4a, 4b to project mutually in opposite directions from flat portions of a metal plate 1, and the two metal plates are laminated in such a manner that the top portions of the mountain-shape portions 4a of the circular beads 4 abut against each other. Therefore, the metal plate 1 is provided with the circular bead 4 having two heights of the mountain-shape portions, and the circular beads 4 of the respective layers are sufficiently subjected to an elastic deformation to thereby effectively prevent leaking of a medium to be sealed (For example, Japanese Patent Publication (KOKAI) No. 2002-54502, refer to page 3, FIG. 2).

However, in the gaskets having such wave-form circular beads, while they are effective for concentrating the surface pressure or enlarging the crushed margins, the rigidity is basically determined by the sectional shape of the beads formed on the plate.

On the other hand, in a cylinder head gasket and the like, even in case the same gasket is used to seal between the same engine members, the sealing performance required by the kind of a hole to be sealed becomes different. For example, in a hole for a cylinder bore, it is required to seal a combustion gas having a high temperature and a high pressure, while in a liquid hole for circulating cooling water and engine oil, it is required to seal a liquid having a comparatively low temperature and pressure.

Also, from a structural reason of an engine, there are generated different surface pressures in a hole for a cylinder bore surrounded by bolt holes for tightening bolts and a liquid hole located on an outer side so that the pressing forces by the tightening bolts are only applied to one side thereof.

In the metal gasket as described above, in case a bead is simply provided, the rigidity of the bead is determined by the shape of the bead, material characteristics of metal of a base plate and a thickness of the base plate. Therefore, the design freedom is limited, and it is difficult to provide the optimum sealing performance with respect to the respective holes to be sealed.

Especially, since a high surface pressure is required around the hole for the cylinder bore, in order not to damage the engine members made of a relatively soft aluminum alloy, it is difficult to use a metal base plate having a high rigidity. On the other hand, there is also a problem that a sufficient rigidity can not be obtained with the conventional shape and arrangement of the bead.

Also, as shown in FIG. 14, in the gasket where the top portions 4a of the mountain-shapes of the wave-forms in a two plate structure abut against each other, in case the abutting beads are mis-aligned, since a predetermined compression rigidity of the beads 4 may not be obtained, it is required to carry out the precise alignment of the abutting beads 4.

However, in a cylinder head gasket and the like having a fine bead of a width less than 3 mm, the positioning is actually difficult, so that an advanced technique is required.

In view of the above, the present invention has been made, and an object of the invention is to provide a metal gasket of a two plate structure excellent in sealing ability, such as a cylinder head gasket, wherein sub-beads are respectively provided around main beads disposed to respective metal base plates for sealing a hole to be sealed and the sub-beads abut against each other so that an adequate bead rigidity can be obtained by constraining the deformation in a radial direction of a main bead of one metal base plate by the sub-bead of the other metal base plate. Thus, the optimum surface pressure distribution can be generated around the hole for the cylinder bore or the like and maintained.

Further objects and advantages of the invention will be apparent from the following description of the invention.

SUMMARY OF THE INVENTION

In order to attain the above objects, a gasket of the invention is formed of a first metal base plate provided with a first main bead and a second metal base plate provided with a second main bead, wherein the first main bead and the second main bead are disposed back to back to project outwardly around a hole to be sealed. The gasket comprises a first inner peripheral side sub-bead smaller than the first main bead disposed on an inner peripheral side of the first main bead; a first outer peripheral side sub-bead smaller than the first main bead disposed on an outer peripheral side of the first main bead; a second inner peripheral side sub-bead smaller than the second main bead disposed to abut against the first inner peripheral side sub-bead on an inner peripheral side of the second main bead; and a second outer peripheral side sub-bead smaller than the second main bead disposed to abut against the first outer peripheral side sub-bead on an outer peripheral side of the second main bead.

Incidentally, it is sufficient that the sub-beads abut against each other under a state where the metal gasket is set. Therefore, the abutment between the sub-beads may include a case where the sub-beads do not abut against each other before they are pressed by a predetermined pressing force, i.e. in an initial shape without being pressed. For example, in the cylinder head gasket, in case the gasket itself is in an initial state, the sub-beads may not abut against each other. It is sufficient that when the gasket is sandwiched between a cylinder head and a cylinder block and tightened by the tightening bolts with a predetermined pressing force, side portions of the sub-beads may abut against each other on either inner side or outer side.

According to the structure, diversification and fine adjustment of the rigidity of the main beads can be attained by correlating the deformations of one main bead and the other main bead with abutments of the sub-beads, and the accuracy of positioning of the two metal base plates can be improved.

In other words, the periphery of one main bead, which has a large deformation quantity in the widthwise direction, can be constrained through abutments of the sub-beads provided on the outer peripheral side and inner peripheral side of the main beads. Thus, the rigidity can be elevated by constraining a displacement in the widthwise direction of one main bead.

Moreover, since the degree of the constraint in the radial direction of one main bead can be adjusted by the shape (here, also including a size) of the other main bead and the material characteristics and plate thickness of the metal base plate, a multiple of surface pressures can be generated through the combination of the two main beads. Thus, a more adequate sealing line corresponding to a hole to be sealed can be formed to thereby improve the sealing ability of the gasket.

Also, since the sub-beads of one metal base plate and the sub-beads of the other metal base plate are disposed to abut against each other in their side portions, the sub-beads guide each other to position themselves. Thus, the two sheets of the metal base plates can be easily and precisely aligned, and a desired sealing surface pressure can be positively obtained through combination of the beads.

Then, the mutual abutments between the sub-beads are carried out by at least one of an abutment between the first inner peripheral side sub-bead and the second inner peripheral side sub-bead and an abutment between the first outer peripheral side sub-bead and the second outer peripheral side sub-bead, through the abutments of the beads formed inwardly respectively. Or, at least one of the abutment between the first inner peripheral side sub-bead and the second inner peripheral side sub-bead and the abutment between the first outer peripheral side sub-bead and the second outer peripheral side sub-bead is carried out through an abutment by fitting one bead into the other bead.

Also, at least one of the first inner peripheral side sub-bead, the second inner peripheral side sub-bead, the first outer peripheral side sub-bead and a second outer peripheral side sub-bead is formed of a plurality of beads. Thus, the constraint in the radial direction can be elevated and the positioning accuracy can be improved.

Then, at least one of the first inner peripheral side sub-bead, the second inner peripheral side sub-bead, the first outer peripheral side sub-bead and the second outer peripheral side sub-bead is intermittently provided in the circumferential direction, so that the strength of the binding force can be easily adjusted.

In case the sealing is carried out by half beads, in a gasket to attain the above objects, formed of a first metal base plate and a second metal base plate, wherein a first main half bead of the first metal base plate and a second main half bead of the second metal base plate are disposed back to back with a projected portion outward, respectively, around a hole to be sealed, a first outer peripheral side sub-bead smaller than the first main half bead is provided on an outer peripheral side of the first main half bead and a second outer peripheral side sub-bead smaller than the second main half bead is disposed to abut against a side portion of the first outer peripheral sub-bead in a side portion thereof on an outer peripheral side of the second main half bead.

Also, in the half bead metal gasket, the abutment between the first outer peripheral side sub-bead and the second outer peripheral side sub-bead is structured by the abutment of the side portions of the beads projected inward; or the abutment between the first outer peripheral side sub-bead and the second outer peripheral side sub-bead is structured by fitting one bead into the other bead.

Further, at least one of the first outer peripheral side sub-bead and the second outer peripheral side sub-bead is discontinuously or intermittently provided in a circumferential direction, so that the strength of the binding force can be easily adjusted.

DETAILED DESCRIPTION OF PREFERRED EMBODIMENTS

Figure 1:
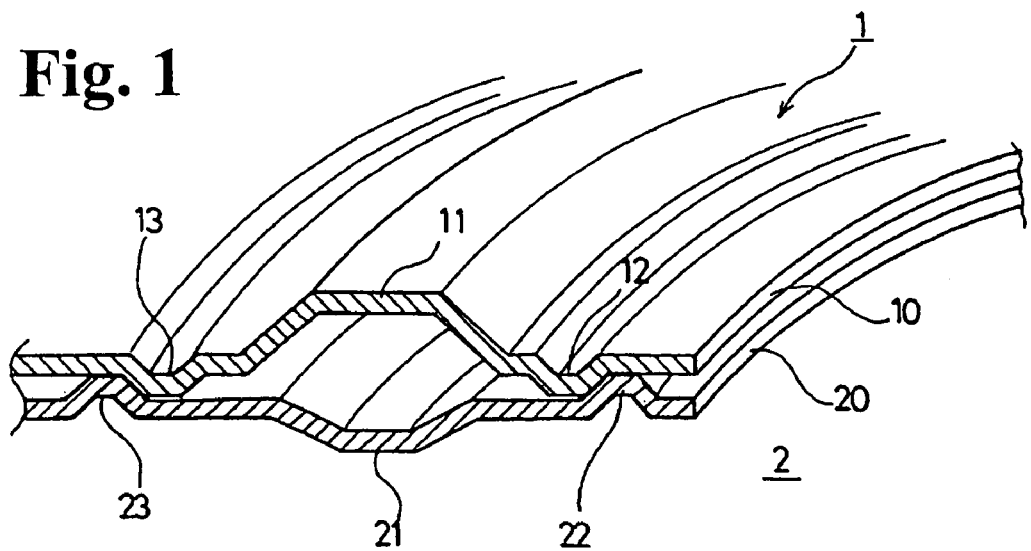
FIG. 1 is a partial perspective view with a section showing a cylinder head gasket of a first embodiment according to the invention.

Next, a cylinder head gasket, as an example, of an embodiment of a metal gasket according to the present invention will be explained with reference to the accompanying drawings.

As shown in FIGS. 1 through 12, metal gaskets 1 and 1A of the embodiments according to the invention are cylinder head gaskets to be sandwiched between a cylinder head and a cylinder block (cylinder body) of an engine to seal a combustion gas of high temperature and high pressure from cylinder bores, and a liquid, such as cooling water or cooling oil, flowing through a cooling water path or a cooling oil path.

Incidentally, FIGS. 1 through 12 are schematic views, wherein dimensions and horizontal to vertical ratios of a plate thickness, a bead, a coating film and the like of the cylinder head gaskets 1, 1A are different from the real measurements, so that sealing portions are exaggerated, which makes them easily understandable.

As shown in FIGS. 1 through 6, FIGS. 7 through 11, and FIG. 12, cylinder head gaskets 1, 1A according to the present invention include two plates, i.e. a first metal base plate 10 and a second metal base plate 20, formed of an annealed stainless steel, processed stainless steel (spring steel plate), soft iron plate or the like. These metal base plates 10, 20 are produced in conformity with the shape of an engine member, such as a cylinder block, and provided with holes 2 for cylinder bores, liquid holes 3 for circulating cooling water and engine oil, bolt holes 4 for tightening bolts and the like.

In the present invention, in case a main bead is formed of a full bead, a first main bead 11 of the first metal base plate 10 and a second main bead 21 of the second metal base plate 20 are disposed back to back, i.e. aligned, around the hole 2 for the cylinder bore to be sealed so that both beads project outward, respectively.

Also, as shown in FIGS. 1 through 6, in the first metal base plate 10, a first inner peripheral side sub-bead 12 smaller than the first main bead 11 is provided on an inner peripheral side of the first main bead 11, and a first outer peripheral side sub-bead 13 smaller than the first main bead 11 is provided on an outer peripheral side of the first main bead 11, respectively.

Also, in the second metal base plate 20, a second inner peripheral side sub-bead 22 smaller than the second main bead 21 is provided to abut against the first inner peripheral side sub-bead 12 on the inner peripheral side of the second main bead 21, and a second outer peripheral side sub-bead 23 smaller than the second main bead 21 is provided to abut against the first outer peripheral side sub-bead 13 on the outer peripheral side of the second main bead 21.

Figure 2:
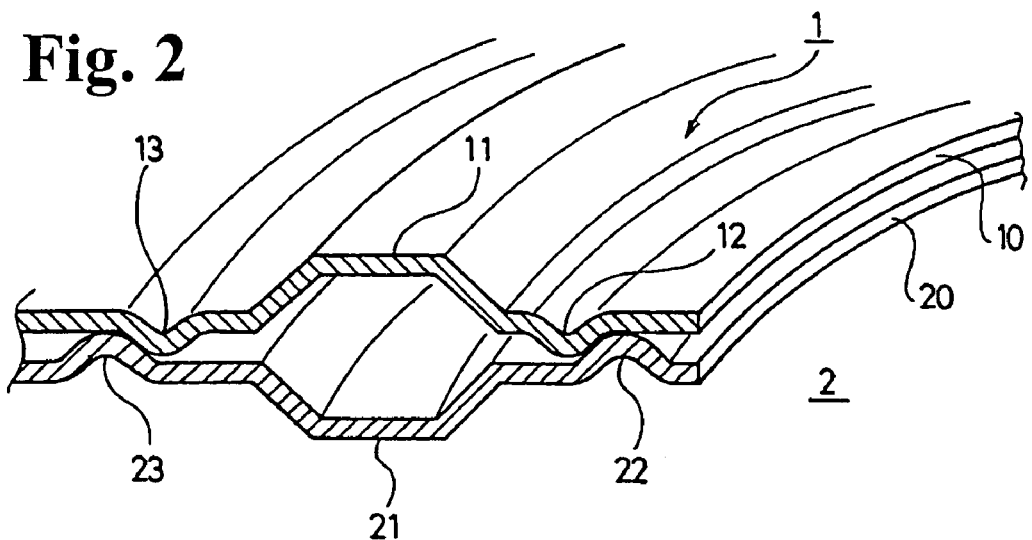
FIG. 2 is a partial perspective view with a section showing another example of a cylinder head gasket of the first embodiment according to the invention.

In the first embodiment as shown in FIGS. 1 and 2, the abutment between the first inner peripheral side sub-bead 12 and the second inner peripheral side sub-bead 22 and the abutment between the first outer peripheral side sub-bead 13 and the second outer peripheral side sub-bead 23 are carried out, respectively, such that the respective side portions of mutually inward projecting beads abut against each other.

While the first main bead 11 and the second main bead 21 normally have different shapes (including sizes), they may be the same shape. When the first main bead 11 and the second main bead 21 have the same shape, since there may be a temperature difference between the first metal base plate 10 and the second metal base plate 20, the sub-beads 12, 13, 22, 23 mainly play a role for mutually positioning the metal base plates 10 and 20 though there is deformation constraint of the main beads 11, 21.

In FIG. 1, the first main bead 11 and the second main bead 21 have different shapes, and the sub-beads 12, 13, 22, 23 have a trapezoidal shape. In FIG. 2, the first main bead 11 and the second main bead 21 have the same shape, and the sub-beads 12, 13, 22, 23 have a circular arc shape.

Figure 3:
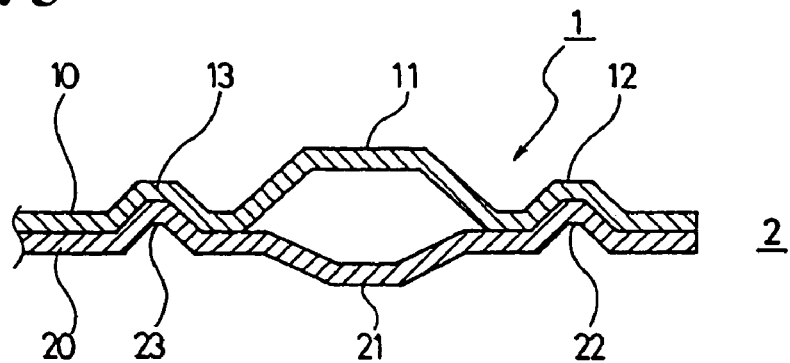
FIG. 3 is a partial sectional view showing a cylinder head gasket of a second embodiment according to the invention.
Figure 4:
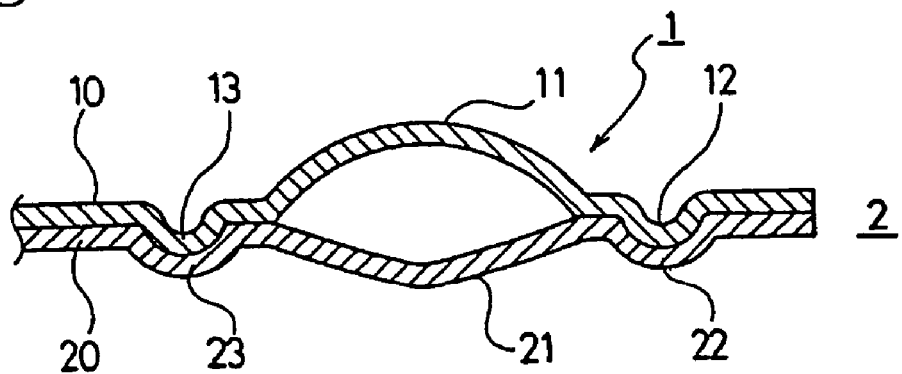
FIG. 4 is a partial sectional view showing a cylinder head gasket of another example of the second embodiment according to the invention.

Also, in a second embodiment as shown in FIGS. 3 and 4, a first inner peripheral side sub-bead 12 abuts against a second inner peripheral side sub-bead 22, and a first outer peripheral side sub-bead 13 abuts against a second outer peripheral side sub-bead 23. The abutments are made such that one bead enters the other bead to fit each other.

In FIG. 3, a first main bead 11 and a second main bead 21 and respective sub-beads 12, 13, 22, 23 are made in a trapezoidal shape. In FIG. 4, the first main bead 11 and the second main bead 21 and the respective sub-beads 12, 13, 22, 23 are made in a circular arc shape.

Figure 5:
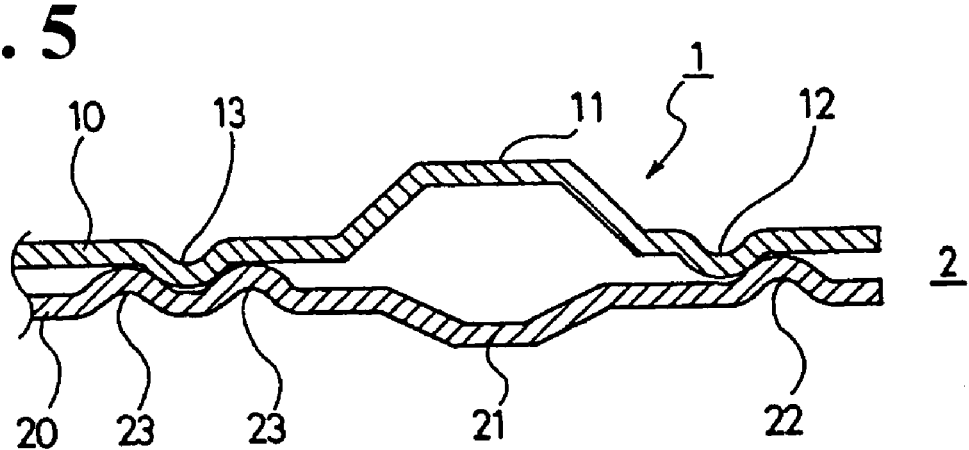
FIG. 5 is a partial sectional view showing a cylinder head gasket of a third embodiment according to the invention.
Figure 6:
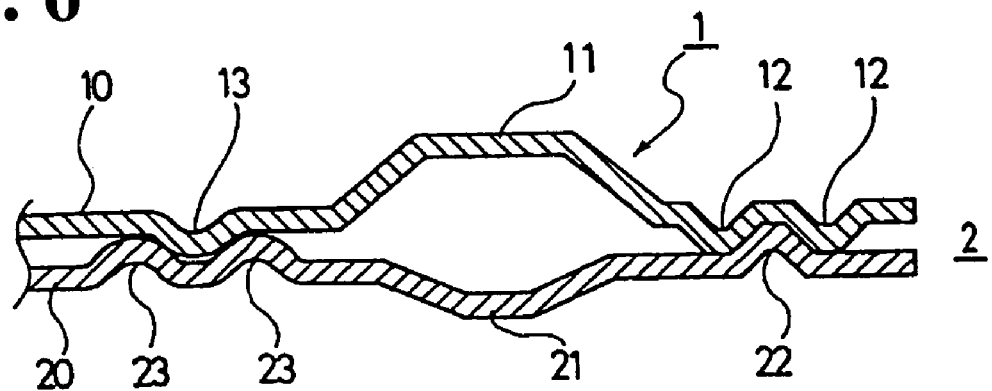
FIG. 6 is a partial sectional view showing a cylinder head gasket of another example of the third embodiment according to the invention.

In a third embodiment of the invention as shown in FIGS. 5 and 6, at least one of a first inner peripheral side sub-bead 12, a second inner peripheral side sub-bead 22, a first outer peripheral side sub-bead 13 and a second outer peripheral side sub-bead 23 is formed of a plurality of beads.

In FIG. 5, the second outer peripheral side sub-bead is formed of two beads 23 so that the first outer peripheral side sub-bead 13 is sandwiched therebetween. In FIG. 6, further, the first inner peripheral side sub-bead is formed of two beads 12 so that the second inner peripheral side sub-bead 22 is sandwiched therebetween. The number of the sub-beads may be two to three, if there is enough room to provide. There is no specific limitation.

In all structures of FIGS. 1 through 6, the sub-beads 12, 13, 22, 23 may be provided around the whole circumference in the circumferential direction, or may be discontinuously or intermittently provided. With the length and the position of the sub-beads, the magnitude of the constraint (strength) in a radial direction of the main bead 11 (or 21) can be finely adjusted.

Incidentally, an example of the dimensions of parts of the gasket will be shown hereunder. In case a diameter of a hole 2 for a cylinder bore is about 50 mm-90 mm, a thickness of the first metal base plate 10 and the second metal base plate 20 is 0.10 mm–0.40 mm, respectively; a height of the trapezoidal beads of the first main bead 11 and the second main bead 21 is 0.05 mm–0.30 mm; a bead width (length of the hem portion) is 1.0 mm–5.0 mm; a bead height of the trapezoidal beads of the first inner peripheral side sub-bead 12 and the second inner peripheral side sub-bead 22 is 0.01 mm–0.15 mm, and a width of the beads thereof is 0.5 mm–3.0 mm; and a height of the trapezoidal beads of the second outer peripheral side sub-bead 13 and the second outer peripheral side sub-bead 23 is 0.01 mm–0.15 mm, and a bead width thereof is 1.0–3.0 mm.

In the present invention, in case the main beads are formed of half beads, a first main half bead 11A of the first metal base plate 10 and a second main half bead 21A of the second metal base plate 20 are disposed back to back, i.e. aligned, to project outwardly around the hole 2 for the cylinder bore to be sealed.

Figure 7:
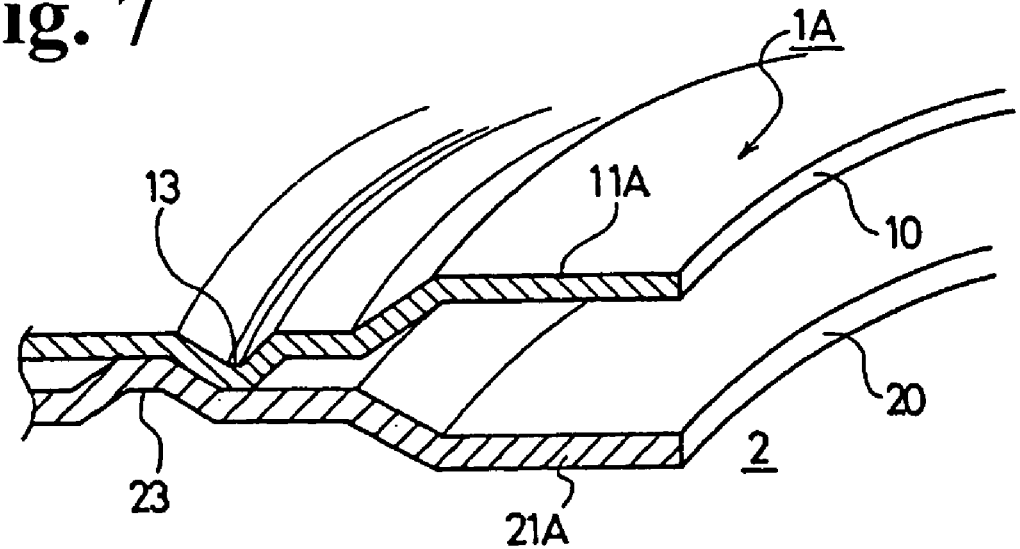
FIG. 7 is a partial perspective view with a section of a cylinder head gasket of a fourth embodiment according to the invention.
Figure 8:
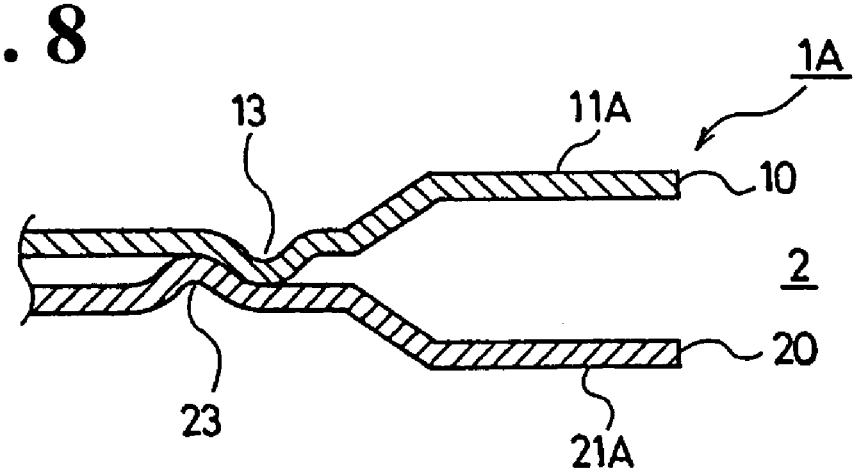
FIG. 8 is a partial sectional view showing a cylinder head gasket of another example of the fourth embodiment according to the invention.

Also, as shown in FIGS. 7 and 8, the first metal base plate 10 is provided with a first outer peripheral side sub-bead 13 smaller than the first main half bead 11A on an outer peripheral side of the first main half bead 11A, and the second metal base plate 20 is provided with a second outer peripheral side sub-bead 23 smaller than the second main half bead 21A to abut against the first outer peripheral side sub-bead 13 on the outer peripheral side of the second main half bead 21A.

In the fourth embodiment as shown in FIGS. 7 and 8, the abutment between the first outer peripheral side sub-bead 13 and the second outer peripheral side sub-bead 23 is carried out by allowing the respective side portions of beads projecting inward to abut against each other.

The first main half bead 11A and the second main half bead 21A are normally formed in a different shape (including size), but they may have the same shape. In case they have the same shape, since the temperature of the first metal base plate 10 may be different from that of the second metal base plate 20, the sub-beads 13, 23 mainly play a role for mutually positioning the metal base plates 10 and 20 though there is deformation constraint of the main half beads 11A, 21A.

In FIG. 7, the first main half bead 11A and the second main half bead 21A have a different shape, respectively, and the sub-beads 13, 23 have a trapezoidal shape; and in FIG. 8, the first main half bead 11A and the second main half bead 21A have the same shape and the sub-beads 13, 23 have a circular arc shape.

Figure 9:
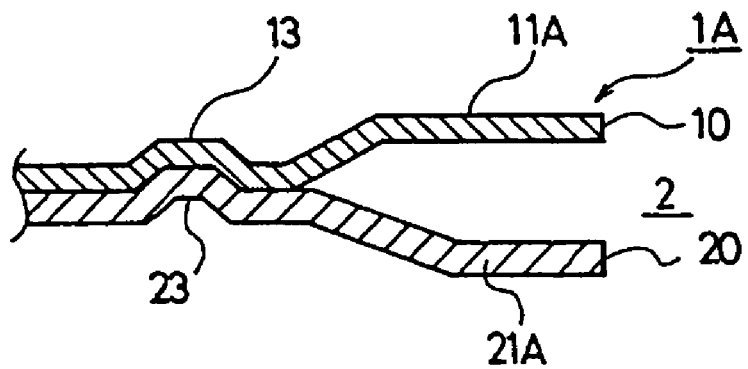
FIG. 9 is a partial sectional view showing a cylinder head gasket of a fifth embodiment according to the invention.
Figure 10:
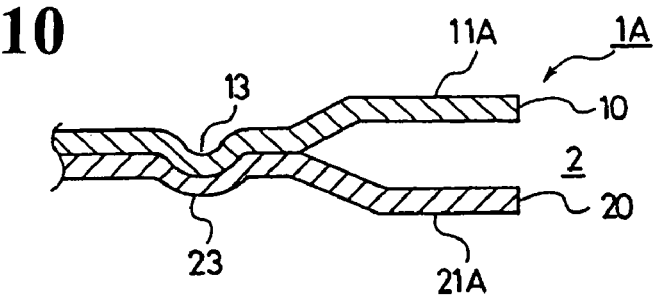
FIG. 10 is a partial sectional view showing a cylinder head gasket of another example of the fifth embodiment according to the invention.

In a fifth embodiment as shown in FIGS. 9 and 10, the abutment between the first outer peripheral side sub-bead 13 and the second outer peripheral side sub-bead 23 is carried out by fitting one bead into the other bead. In FIG. 9, the respective sub-beads 13, 23 are formed in a trapezoidal shape; and in FIG. 10, the respective sub-beads 13, 23 are formed in a circular arc shape.

Figure 11:
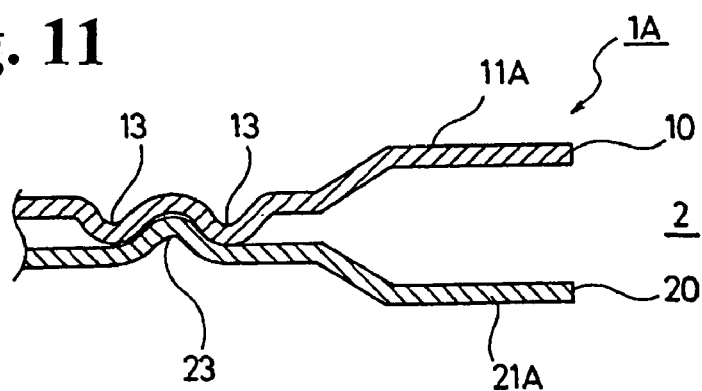
FIG. 11 is a partial sectional view showing a cylinder head gasket of a sixth embodiment according to the invention.
Figure 12:
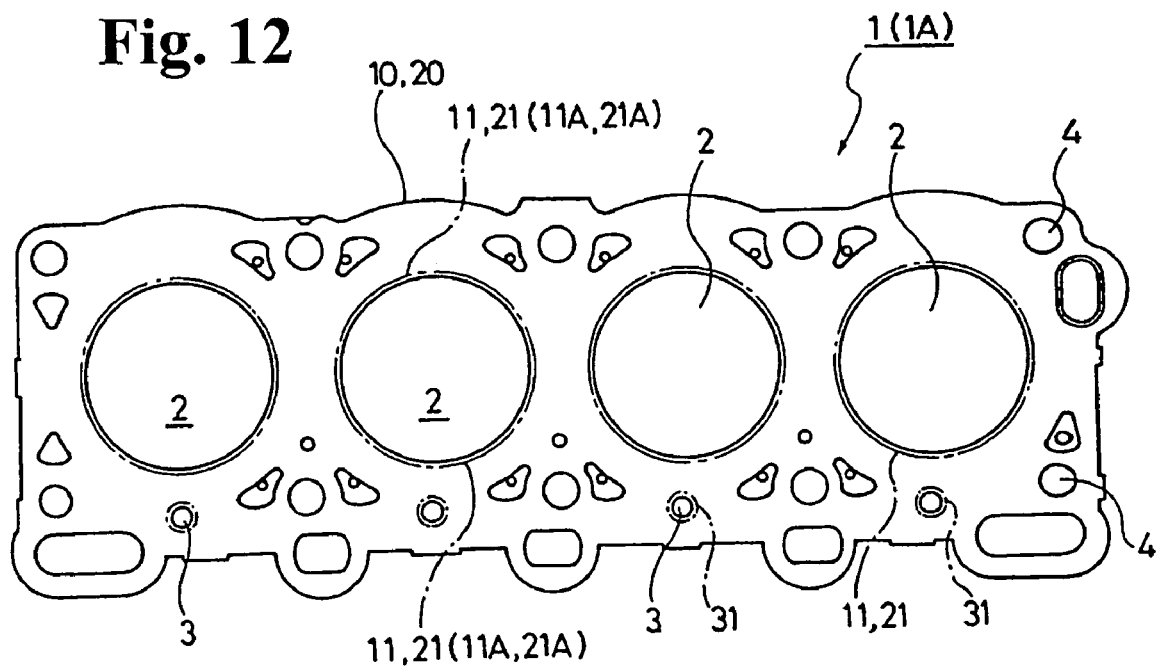
FIG. 12 is a plan view of a cylinder head gasket of an embodiment according to the present invention.
Figure 13:
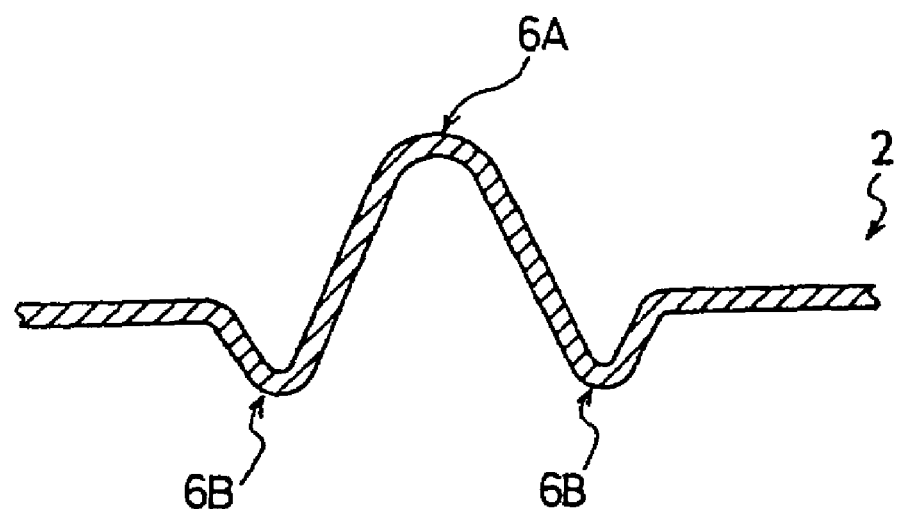
FIG. 13 is a partial sectional view showing a conventional gasket.
Figure 14:
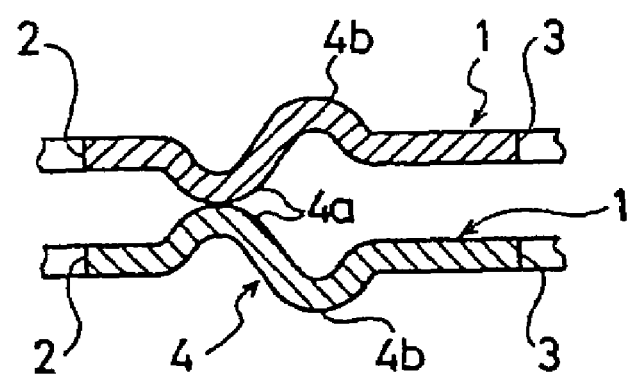
FIG. 14 is a partial sectional view showing a conventional metal gasket.

In an eighth embodiment as shown in FIG. 11, at least one of the first outer peripheral side sub-bead 13 and the second outer peripheral side sub-bead 23 is formed of plural beads. In FIG. 11, the first outer peripheral side sub-bead is formed of two beads 13 to sandwich the second outer peripheral side sub-bead 23. The number of the sub-beads may be two to three, if there is an enough space, and there is no specific limitation.

In all structures of FIGS. 7 through 11, the sub-beads 13, 23 may be provided around the whole circumference in the circumferential direction, or may be intermittently provided. By the lengths and the positions of the sub-beads, the magnitude of the constraint (strength) in a radial direction of the main half-bead 11A (or 21A) can be finely adjusted.

According to the cylinder head gaskets 1, 1A having the structures as described above, the periphery of one main bead 11 (11A, 21 or 21A), which has a large deformation quantity in the widthwise direction, can be constrained through abutment of the respective side portions of the sub-beads 12, 13, 22, 23 provided on the outer peripheral side and inner peripheral side of the main beads 11, 21 or the main half beads 11A, 21A. Thus, the rigidity of the one main bead 11 (21, 11A, or 21A) can be increased.

Since the degree of the constraint in the radial direction of one main bead 11 (11A, 21, or 21A) can be adjusted by the shape of the other main bead 21 (11, 11A or 21A) and the material characteristics and plate thickness of the metal base plate 20 (or 10), a multiple of surface pressures can be generated through the combination of the main beads 11, 21 or the main half beads 11A, 21A.

Also, since the sub-beads 12, 13 of one metal base plate 10 and the sub-beads 22, 23 of the other metal base plate 20 are disposed to abut against each other in their side portions, the sub-beads 12, 13, 22, 23 guide each other to position themselves. Thus, the two sheets of the metal base plates 10, 20 can be easily and precisely aligned. By improving accuracy of the alignment, a desired surface pressure can be positively obtained to thereby carefully respond to the sealing ability required with respect to the hole 2 for the cylinder bore and improve the sealing ability.

Since the sealing ability around a liquid hole 3 is not strict to the sealing ability around the hole 2 for the cylinder bore, a desired sealing ability can be obtained by providing a relatively simple bead 31.

Therefore, the cylinder head gasket 1 having the structure as described above can respond precisely to the sealing ability required by the hole 2 for the cylinder bore and the sealing ability required by the liquid hole 3, respectively. Thus, adequate sealing balances with respect to the respective portions of the metal gasket 1 or 1A can be attained.

Incidentally, the present invention is not limited to only these embodiments. The present invention is also applied to metal gaskets for other use, such as an inlet manifold and an exhaust manifold, in addition to the cylinder head gasket.

As described hereinabove, according to the metal gasket of the invention, the periphery of one main bead, which has a large deformation quantity in the widthwise direction, can be constrained through abutment of the sub-beads provided on the outer peripheral side and inner peripheral side of the main beads. Thus, the rigidity of one main bead can be increased. Since the degree of the constraint in the radial direction of one main bead can be adjusted by the shape of the other main bead and the material characteristics and plate thickness of the metal base plate, multiple surface pressures can be generated through the combination of the two main beads.

Also, since the sub-beads of one metal base plate and the sub-beads of the other metal base plate are disposed to abut against each other in their side portions, the sub-beads guide each other to position themselves. Thus, the two sheets of the metal base plates can be easily and precisely aligned. By improving accuracy of the alignment, a desired surface pressure can be positively obtained.

Therefore, the sealing ability can be improved since the sealing abilities required for the respective holes to be sealed can be adequately dealt and the suitable sealing balances with respect to the various portions of the metal gasket can be attained.

While the invention has been explained with reference to the specific embodiments of the invention, the explanation is illustrative and the invention is limited only by the appended claims.

What is claimed is:

1. A metal gasket having a hole to be sealed, comprising:
   a first metal base plate having a first main bead projecting outwardly therefrom around the hole, a first outer sub-bead section smaller than the first main bead and provided outside the first main bead adjacent thereto, and a first inner sub-bead section smaller than the first main bead and provided inside the first main bead adjacent thereto, said first outer and inner sub-bead sections projecting outwardly in a direction opposite to the first main bead, and
   a second metal base plate laminated with the first metal base plate and having a second main bead disposed at a side opposite to the first main bead to directly face thereto and projecting outwardly around the hole in a direction opposite to the first main bead, a second outer sub-bead section smaller than the second main bead and provided outside the second main bead adjacent thereto, and a second inner subbead section smaller than the second main bead and provided inside the second main bead adjacent thereto, said second outer and inner sub-bead sections projecting outwardly in a direction opposite to the second main bead, a distance between the second outer and inner sub-bead sections being greater than that between the first outer and inner sub-bead sections so that when the first and second metal base plates are assembled, outer surfaces of the second outer and inner sub-bead sections face outer surfaces of the first outer and inner sub-bead sections and entirely sandwich the first outer and inner sub-bead sections therebetween to substantially abut against each other at side peripheries thereof.

2. A metal gasket according to claim 1, wherein said second main bead has a size less than that of the first main bead so that when the gasket is compressed, the second outer and inner subbead sections restrict lateral movements of the first outer and inner sub-bead sections.

3. A metal gasket according to claim 1, wherein each of said first and second outer and inner subbead sections has a trapezoidal shape.

4. A metal gasket according to claim 1, wherein said first metal base plate includes, around one hole, only one first main bead, only one first outer sub-bead section and only one first inner sub-bead section; and said second metal base plate includes, around the one hole, only one second main bead, only one second outer sub-bead section and only one second inner sub-bead section.

5. A metal gasket according to claim 1, wherein only one first main bead is formed between the first outer and inner sub-bead sections, and only one second main bead is formed between the second outer and inner subbead sections.

6. A metal gasket according to claim 1, wherein the first and second metal base plates are arranged so that the first and second main beads are vertically spaced apart from each other when the first and second metal base plates are assembled.

* * * * *